(12) United States Patent
Endo et al.

(10) Patent No.: US 11,417,505 B2
(45) Date of Patent: Aug. 16, 2022

(54) CHANNEL ELECTRON MULTIPLIER AND ION DETECTOR

(71) Applicant: HAMAMATSU PHOTONICS K.K., Hamamatsu (JP)

(72) Inventors: Takeshi Endo, Hamamatsu (JP); Hiroshi Kobayashi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/332,276

(22) Filed: May 27, 2021

(65) Prior Publication Data

US 2022/0020579 A1    Jan. 20, 2022

(30) Foreign Application Priority Data

Jul. 15, 2020  (JP) .............................. JP2020-121645

(51) Int. Cl.
*H01J 43/18* (2006.01)
*G01T 1/28* (2006.01)
*H01J 43/12* (2006.01)

(52) U.S. Cl.
CPC ................ *H01J 43/18* (2013.01); *G01T 1/28* (2013.01); *H01J 43/12* (2013.01)

(58) Field of Classification Search
None
See application file for complete search history.

(56) References Cited

U.S. PATENT DOCUMENTS

| | | | | |
|---|---|---|---|---|
| 6,045,677 A | * | 4/2000 | Beetz, Jr. | H01J 43/246 205/213 |
| 6,650,049 B1 | * | 11/2003 | Kyushima | H01J 43/04 313/532 |

FOREIGN PATENT DOCUMENTS

| | | | |
|---|---|---|---|
| GB | 2236896 | * | 4/1991 |
| JP | S52-026150 A | | 2/1977 |
| JP | H03-053443 A | | 3/1991 |
| JP | 2011-181336 A | | 9/2011 |

* cited by examiner

*Primary Examiner* — Ashok Patel
(74) *Attorney, Agent, or Firm* — Faegre Drinker Biddle & Reath LLP (57) ABSTRACT

A CEM and an ion detector of one embodiment have a structure for enabling ion detection with higher sensitivity than the prior art. A channel electron multiplier includes a channel body, an input-side conductive layer, an output-side conductive layer, and an electrode. The channel body includes a channel, and a resistance layer and an electron emission layer formed on the channel's inner wall surface. The input-side conductive layer is provided on the channel body, and a part thereof extends into the tapered opening. The output-side conductive layer is provided on the tapered opening. The electrode has openings through which charged particles pass, and is disposed on an opposite side of the output end face to the input end face. The electrode and the input-side conductive layer are set to the same potential to eliminate the influence of an external electric field in the tapered opening.

13 Claims, 8 Drawing Sheets

CHANNEL ELECTRON MULTIPLIER AND ION DETECTOR

TECHNICAL FIELD

The present invention relates to a channel electron multiplier and an ion detector including the channel electron multiplier.

BACKGROUND

As a detection device applicable to a mass spectrometer or the like, for example, an ion detector including a channel electron multiplier (hereinafter, referred to as a "CEM") disclosed in Japanese Patent Application Laid-Open No. S52 26150 (Patent Document 1) and Japanese Patent Application Laid-Open No. H3-53443 (Patent Document 2), an input-side electrode (hereinafter, referred to as an "IN electrode") provided on an input end face side of the CEM, an output-side electrode (hereinafter, referred to as an "OUT electrode") provided on an output end face side of the CEM, and an anode that captures electrons emitted from the output end face of the CEM is known. The above-described CEM has a continuous (channel type) dynode structure in which a resistance layer and an electron emission surface are sequentially stacked on a channel inner wall surface. In particular, in Patent Document 1 and Patent Document 2, in order to obtain an area of a channel opening that charged particles (ions) guided to the ion detector by an external electrode reach, an opening (hereinafter, referred to as a "tapered opening") of which an inner wall surface is tapered such that a sectional area gradually decreases along a traveling direction of the ions is provided at an input side end of the channel.

Japanese Patent Application Laid-Open No. 2011-181336 discloses a mesh electrode set to a ground potential (GND) as the external electrode described above.

SUMMARY

The inventors have found the following problems as a result of examining the above-mentioned related art. That is, in recent years, in a mass spectrometer for counting measurement, the improvement of detection efficiency has become an important requirement, and such a requirement cannot be satisfied with detection sensitivity obtained by the above-described related arts.

In particular, in the CEM, in order to obtain an area (detectable area) of the channel opening, it is effective to provide an opening having a special shape (a tapered opening of which a sectional area gradually decreases from the input side toward the output side) at the input side end of the channel. However, when the tapered opening is exposed in an electrostatic field with respect to an external electric field, the disturbance of the electrostatic field in the tapered opening is caused by the permeation of the external electric field. In this case, the efficiency of drawing electrons (secondary electrons) generated in the tapered opening to the output side of the channel decreases, and as a result, detection sensitivity decreases. Since the CEM has a continuous (channel type) dynode structure using a resistive film, a voltage drop also occurs in the tapered opening. In such a situation, when the ions reach the input side of the tapered opening, a voltage that can contribute to multiplication can be used to the maximum (high-sensitivity detection), but when the ions reach the output side of the tapered opening, the voltage that can contribute to multiplication is lost (low-sensitivity detection).

The present invention has been made to solve the above-described problems, and an object of the present invention is to provide a CEM having a structure capable of detecting ions with higher sensitivity than in the related art, and an ion detector including the CEM.

In order to solve the above-described problem, a channel electron multiplier (CEM) according to the present embodiment includes a channel body, an input-side conductive layer, an output-side conductive layer, and an electrode. The channel body includes an input end face that charged particles (ions) reach, an output end face opposing the input end face, and at least one channel connecting the input end face and the output end face. A first resistance layer and a first electron emission layer are formed on an inner wall surface of a channel. The input-side conductive layer is provided so as to continuously cover the input end face and a part of the inner wall surface of the channel. The output-side conductive layer is provided on the output end face such that at least a part is located at an opening end of the channel. The electrode is disposed on an opposite side of the output end face with respect to the input end face and has at least one opening through which the charged particles pass toward the input end face. In particular, the channel includes a tapered opening having an opening end matching the input end face and having an inner wall surface formed such that a sectional area decreases from the input end face toward the output end face. The input-side conductive layer and the electrode are set to the same potential. In the present specification, the "sectional area" of the tapered opening is defined on a plane orthogonal to a central axis of the channel body extending from the input end face toward the output end face.

The ion detector according to the present embodiment includes at least the channel electron multiplier having the above-described structure (channel electron multiplier according to the present embodiment).

Each embodiment according to the present invention can be more sufficiently understood from the following detailed description and the accompanying drawings. These examples are given by way of illustration only and should not be considered as limiting the invention.

Further application scope of the present invention will be apparent from the following detailed description. However, the detailed description and the specific cases, while indicating preferred embodiments of the present invention, are given by way of illustration only, and it is obvious that various modifications and improvements within the scope of the present invention will be apparent to those skilled in the art from this detailed description.

DETAILED DESCRIPTION

Figure 1A:
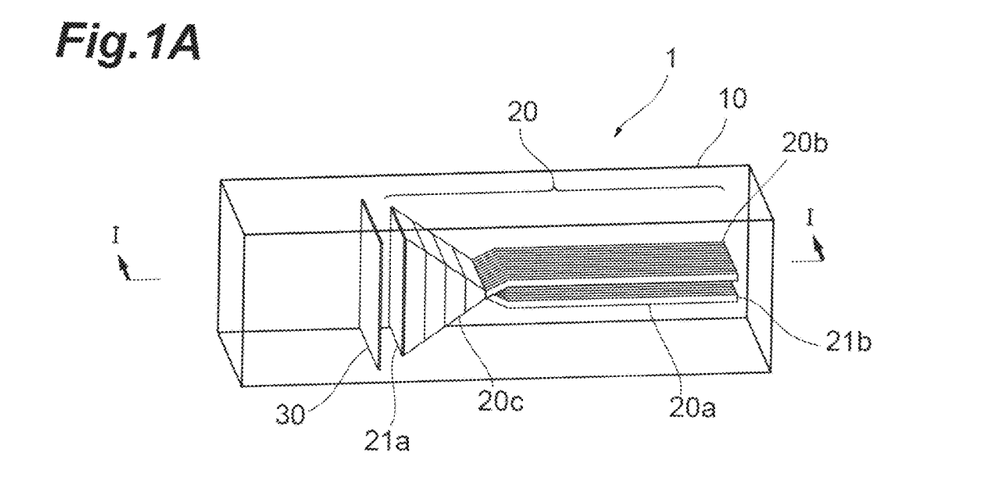
FIGS. 1A and 1B are diagrams illustrating a structure of a simulation model including main parts of a CEM.
Figure 1B:
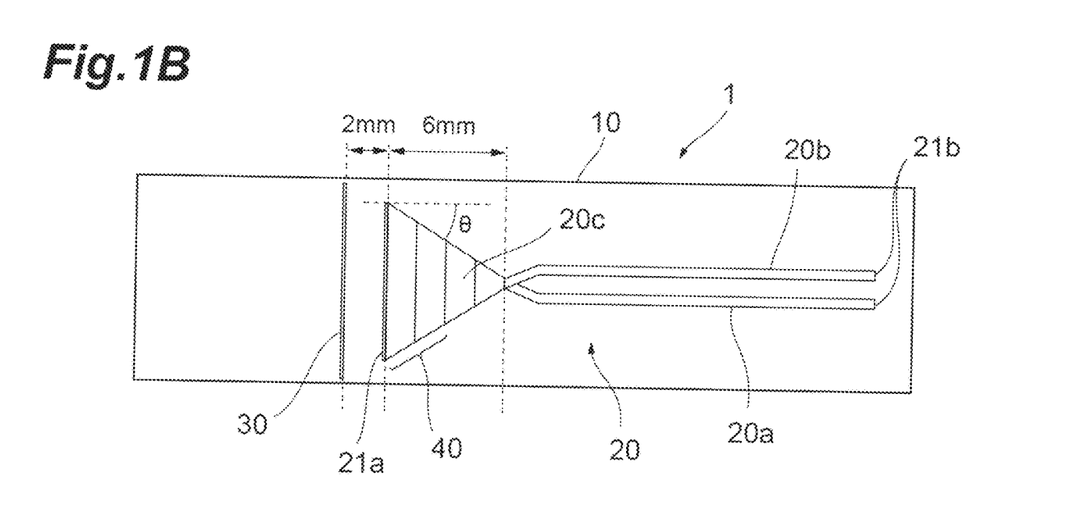

FIGS. 1A and 1B are diagrams illustrating a structure of a simulation model including a main part of a channel electron multiplier (CEM) prepared for examination in the related art, from which the conclusion of the inventors illustrated in the above-described section "Problems to be Solved by the Invention" is obtained. In the simulation performed specifically, as factors for improving the detection efficiency and sensitivity of the CEM, electrostatic field analysis is performed on three factors of "external potential in the vicinity of an input-side opening", "presence or absence of a metal mesh (electrode) covering the input-side opening", and "presence or absence of an insertion electrode portion (part of an input-side conductive layer) provided in the input-side opening". FIG. 1A is a perspective view of a simulation model (basic model) 1, and FIG. 1B is a sectional view of the simulation model 1 taken along a line I-I illustrated in FIG. 1A.

As illustrated in FIGS. 1A and 1B, the simulation model 1 includes a model body 10 comprised of, for example, a ceramic material. A channel 20 is provided, as a main part of the CEM, in the model body 10. The channel 20 has an input end that ions reach, and an output end opposing the input end and from which electrons multiplied in response to the input of the ions are finally emitted. A resistance layer and an electron emission layer are sequentially stacked on an inner wall surface of the channel 20. The resistance layer and the electron emission layer are formed by, for example, atomic layer deposition (ALD) or the like. The channel 20 includes a tapered opening 20c located at the input end, and first and second paths 20a and 20b provided between the tapered opening 20c and the output end. The tapered opening 20c has an opening end matching the input end, and has a structure in which an inner wall surface is shaped such that a sectional area decreases from the input end toward the output end. The first and second paths 20a and 20b are two paths connecting an output port of the tapered opening 20c and the output end of the channel 20, and both input ports of the first and second paths are connected to the output port of the tapered opening 20c. An input-side conductive layer 21a connected to an IN electrode for setting a predetermined potential is provided at the input end of the channel 20 (matching the opening end of the tapered opening 20c), and an output-side conductive layer 21b connected to an OUT electrode is provided at the output end of the channel 20 (matching output ends of the first and second paths 20a and 20b). An external electrode 30 for guiding the ions to the tapered opening 20c of the channel 20 is provided in the model body 10. In the example illustrated in FIG. 1B, a region 40 is a region of the inner wall surface of the tapered opening 20c in which a part of the input-side conductive layer 21a can be disposed.

In the simulation model 1, a potential of the external electrode 30 is set to a ground potential (GND), a potential of the input-side conductive layer 21a is set to −2000V, and a potential of the output-side conductive layer 21b is set to −100V. A distance between the external electrode 30 and the input end of the channel 20 (the opening end of the tapered opening 20c) is 2 mm, and a distance (hereinafter, referred to as a "taper length".) from the opening end of the tapered opening 20c to the output port of the tapered opening 20c is 6 mm. An area of the opening end of the tapered opening 20c (effective area of the CEM) is 8 mm×7.2 mm. A taper angle θ is 64°.

The electrostatic field analysis is performed on first to third CEM structures deformed from the simulation model 1 having the above-described structure. In the first CEM structure, a mesh electrode is not disposed at the opening end of the tapered opening 20c. In the region 40, a part (insertion electrode) of the input-side conductive layer 21a is not disposed. In the second CEM structure, a mesh electrode is not disposed at the opening end of the tapered opening 20c. However, in the region 40, a part (insertion electrode) of the input-side conductive layer 21a is disposed between an inner wall of the tapered opening 20c and the resistance layer. In the third CEM structure, a mesh electrode is disposed at the opening end of the tapered opening 20c. However, in the region 40, a part (insertion electrode) of the input-side conductive layer 21a is not disposed.

In an environment from which the external electrode 30 is removed, in the first CEM structure, it is confirmed by the electrostatic field analysis that a voltage drops also in the tapered opening 20c. In this case, when the ions reach the output port side of the tapered opening 20c, the occurrence of a voltage loss of several hundred V is expected. That is, since a potential difference available for electron multiplication is not obtained in a potential difference (hereinafter, referred to as a "CEM voltage".) from the input end to the output end of the channel 20, a gain in accordance with a design value is not obtained. On the other hand, in the environment in which the external electrode 30 is removed, since the voltage loss in the tapered opening 20c is reduced in the second CEM structure, a high gain can be expected.

In an environment in which the external electrode 30 is disposed, in the first CEM structure, since an electrostatic field in the tapered opening 20c is influenced by an external electric field (the entry of the external electric field into the tapered opening 20c is confirmed as a result of the electrostatic field analysis), a dead area (area where the electrons generated in the tapered opening 20c are not drawn into the first and second paths 20a and 20b) expands while an effective area is reduced (about ¼ with respect to an area of the opening end). On the other hand, in the environment in which the external electrode 30 is disposed, in the third CEM structure, the mesh electrode is disposed at the opening end of the tapered opening 20c. In this case, it is confirmed by the electrostatic field analysis that the influence of the external electric field is eliminated (the entire tapered opening 20c is available as the effective area). That is, in the case of the third CEM structure, it can be expected that four times the detection efficiency of the first CEM structure is achieved.

As a result of the above consideration, it is confirmed that the combination of the suppression of the voltage loss at the tapered opening (increase in gain) and the shielding of the external electric field (securing of the effective area) is effective for realizing higher sensitivity detection in an ion detector.

Details of Embodiment of Present Disclosure

Hereinafter, contents of an embodiment of the present disclosure will be individually listed and described.

(1) As one aspect, a channel electron multiplier (CEM) according to the present embodiment includes a channel body, an input-side conductive layer, an output-side conductive layer, and an electrode. The channel body includes an input end face that charged particles (ions) reach, an output end face opposing the input end face, and at least one channel connecting the input end face and the output end face. A first resistance layer and a first electron emission layer are formed on an inner wall surface of a channel. The input-side conductive layer is provided so as to continuously cover the input end face and a part of the inner wall surface of the channel. The output-side conductive layer is provided on the output end face such that at least a part is located at an opening end of the channel. The electrode is disposed on an opposite side of the output end face with respect to the input end face, and has at least one opening through which ions pass toward the input end face. In particular, the channel includes a tapered opening having an opening end matching the input end face and having a shape formed such that a sectional area decreases from the input end face toward the output end face. The input-side conductive layer and the electrode are set to the same potential.

As described above, in the CEM according to the present embodiment, a part of the input-side conductive layer (a conductor for setting the potential of the channel input end via the IN electrode) provided on the input end face is disposed, as an insertion electrode, in the tapered opening, and thus, a loss of a CEM voltage can be effectively suppressed. The electrode having the opening through which the ions pass and set to the same potential as that of the input-side conductive layer is disposed at the opening end of the tapered opening. Accordingly, the influence of an external electric field on an electrostatic field in the tapered opening is shielded, and a sufficient effective area in the tapered opening can be secured.

(2) As one aspect of the present embodiment, preferably, in an input-side region of the tapered opening including at least the opening end matching the input end face, a part of the input-side conductive layer is directly provided on an inner wall of the tapered opening.

(3) As one aspect of the present embodiment, in an input-side region of the tapered opening including at least the opening end matching the input end face, the first resistance layer may be directly provided on an inner wall of the tapered opening, the first electron emission layer may be directly provided on the first resistance layer, and a part of the input-side conductive layer may be directly provided on the first electron emission layer. In such a sectional configuration, as one aspect of the present embodiment, in the input-side region of the tapered opening including at least the opening end matching the input end face, a second resistance layer is directly provided on the input-side conductive layer, and a second electron emission layer is directly provided on the second resistance layer. As one aspect of the present embodiment, the second electron emission layer is preferably comprised of a high-gamma material. Specifically, as one aspect of the present embodiment, the second electron emission layer is preferably comprised of magnesium fluoride. In the configuration in which a part of the input-side conductive layer is directly provided on the first electron emission layer, since the patterning or the like of the first resistance layer and the first electron emission layer becomes unnecessary, the CEM can be easily manufactured.

(4) As one aspect of the present embodiment, as a length defined along a central axis of the channel body extending from the input end face toward the output end face, a length of a part of the input-side conductive layer located in the tapered opening (hereinafter, referred as an "insertion amount") is preferably less than or equal to ½ of a taper length of the tapered opening. This is because the detection efficiency itself decreases when an insertion amount of the input-side conductive layer exceeds ½ of a taper length.

(5) As one aspect of the present embodiment, the electrode may be in contact with the input-side conductive layer. In this case, as one aspect of the present embodiment, the electrode is preferably comprised of a spring material. On the other hand, as one aspect of the present embodiment, the electrode may be disposed at a location separated from the input-side conductive layer by a predetermined distance in a space on an opposite side of the output end face with respect to the input end face. Since the electrode is set to the same potential as that of the input-side conductive layer, the disturbance of the electrostatic field in the tapered opening (influence of the external electric field) can be avoided without depending on the installation location of the electrode.

(6) As one aspect of the present embodiment, the electrode preferably has a mesh structure. In particular, an opening ratio of the mesh electrode applied to the present embodiment (the occupancy of an opening in an effective region where the mesh is formed) is preferably 50% to 95%. The opening ratio of the mesh electrode may partially vary (for example, a configuration in which the opening ratio is different between the vicinity of the center of the mesh and the periphery of the mesh).

(7) As one aspect, an ion detector according to the present embodiment includes at least the CEM having the above-described structure (the CEM according to the present embodiment), and an anode configured to capture electrons emitted from the output end face of the CEM.

(8) As one aspect, an ion detector according to the present embodiment may include the CEM having the above-described structure, an aperture member, a Faraday cup, and an anode. The aperture member causes ion to pass toward a space in which the CEM is disposed (a space defined by a housing of the ion detector). Accordingly, the aperture member constitutes a part of the housing of the ion detector. The Faraday cup functions to shield ions of the ions passed through the aperture member traveling toward a space excluding the input end face of the CEM. The anode is an electrode configured to capture electrons emitted from the output end face of the CEM.

As described above, each of the aspects listed in the section [Details of Embodiment of Present Disclosure] is applicable to each of all the remaining aspects or all combinations of these remaining aspects.

Details of Embodiment of Present Disclosure

Hereinafter, specific structures of a channel electron multiplier and an ion detector according to the present invention will be described in detail with reference to the accompanying drawings. The present invention is not limited to these examples, but is defined by the scope of the claims. The present invention is intended to include meanings equivalent to the claims and all modifications within the claims. In the description of the drawings, the same components are denoted by the same reference signs, and the redundant description will be omitted.

Figure 2:
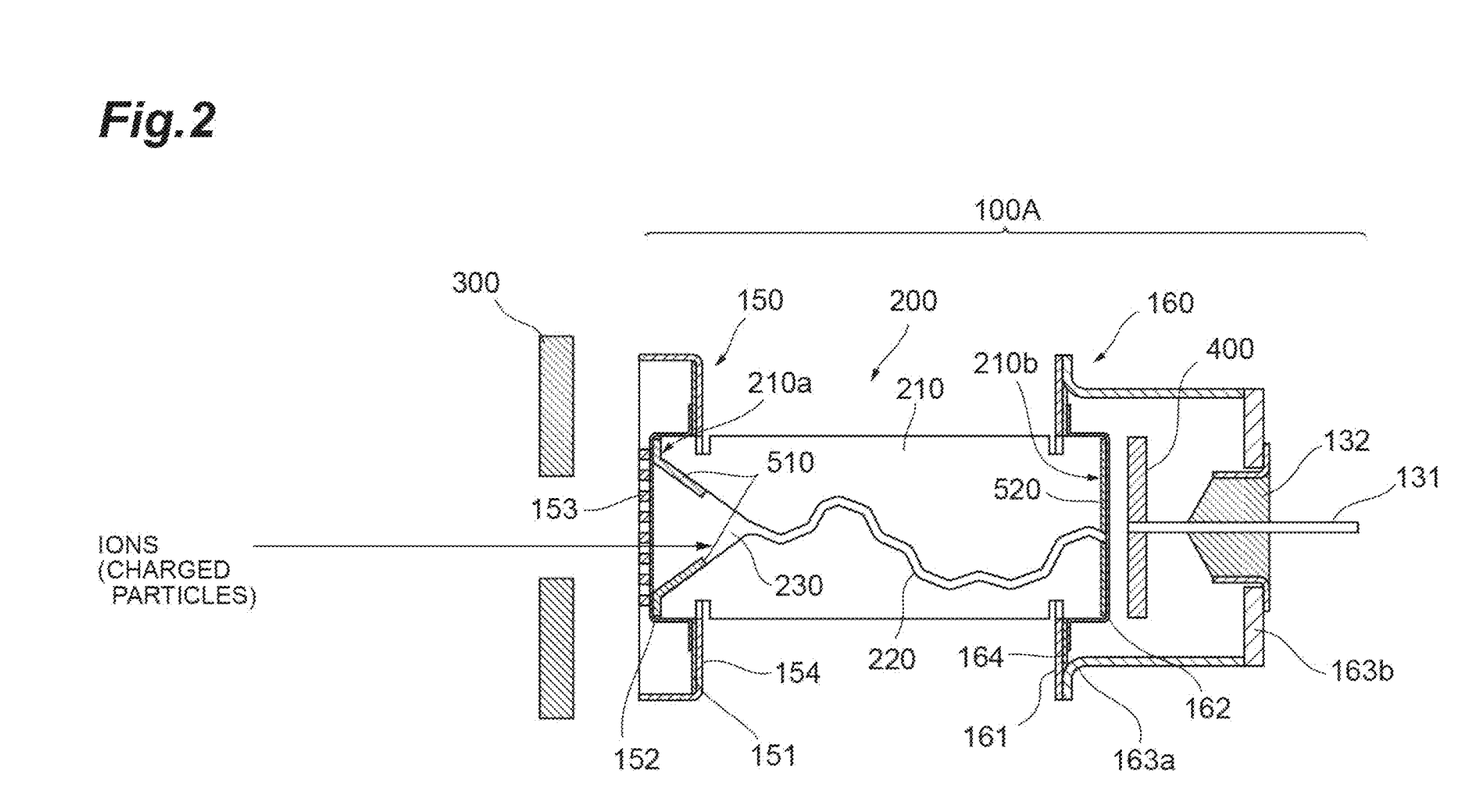
FIG. 2 is a sectional view illustrating a first structure of an ion detector according to the present embodiment.

FIG. 2 is a sectional view illustrating a first structure of an ion detector according to the present embodiment. FIG. 2 illustrates a structure in a section corresponding to the section illustrated in FIG. 1B. An ion detector 100A having the first structure includes a channel electron multiplier (CEM) and an anode 400. A CEM 200 has an input end face 210a disposed to face an external electrode 300 (having an opening through which ions pass) for guiding ions (charged particles) to the CEM 200, and an output end face 210b located on an opposite side of the external electrode 300 with respect to the input end face 210a. The CEM 200 includes a channel body 210, an input-side electrode (hereinafter, referred to as an "IN electrode") 150 provided on a side of the channel body 210 that the ions reach (input end face 210a side), and an output-side electrode (hereinafter, referred to as an "OUT electrode") 160 provided on a side of the channel body 210 opposite to the IN electrode 150 (output end face 210b side). The anode 400 is disposed on an output end side of the channel body 210. When the ion detector 100A is used in a mass spectrometer, the external electrode 300 is an electrode close to an ion detector of a mass separation unit such as a quadrupole or an ion trap, an aperture provided between the mass separation unit and the ion detector 100A in order to shield external noise, a lens that guides charged particles from the mass separation unit to the ion detector, or the like.

A channel 220 including a tapered opening 230 is built in the channel body 210. An opening end of the tapered opening 230 matches the input end face 210a of the channel body 210, and an output port of the tapered opening 230 is located in the channel body 210 and is connected to the output end face 210b of the channel body 210.

The IN electrode 150 is attached to one end of the channel body 210 including the input end face 210a, and the OUT electrode 160 is attached to the other end of the channel body 210 including the output end face 210b.

Figures 5A, 5B, 5C:
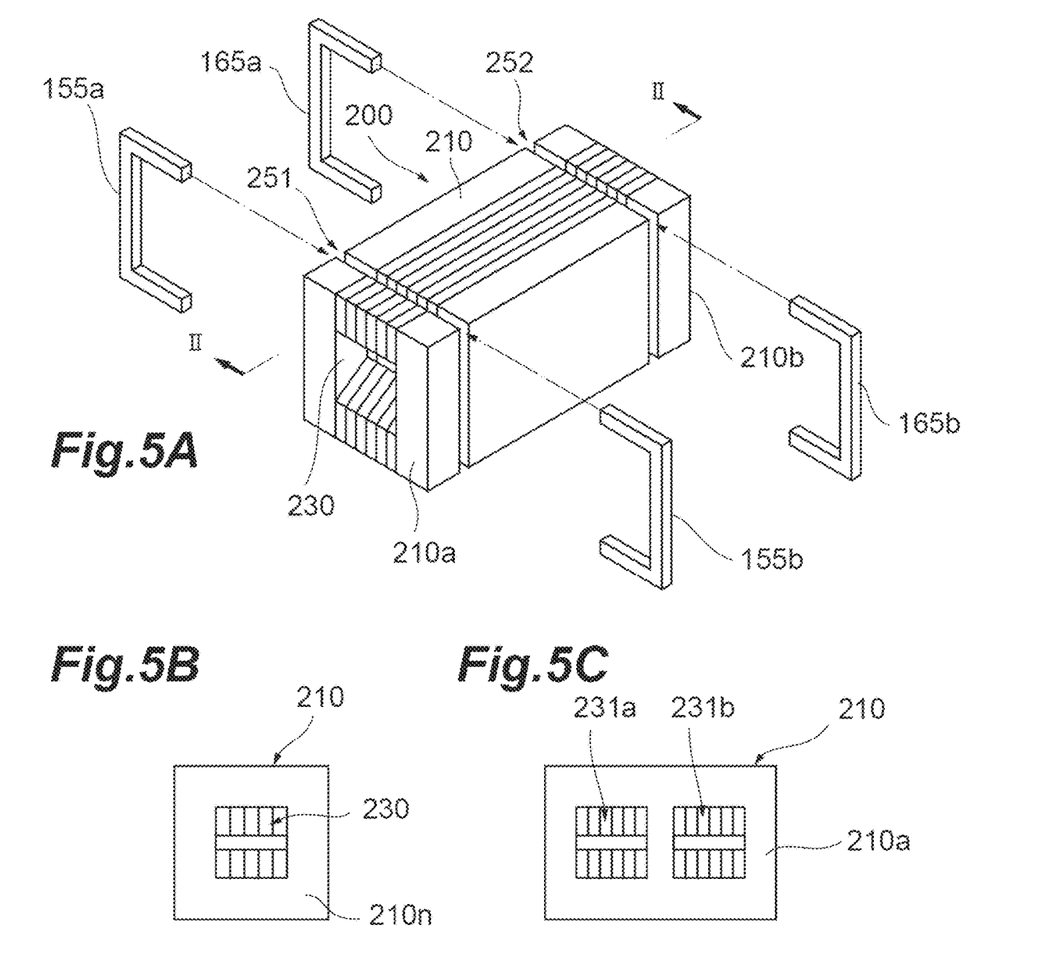
FIGS. 5A to 5E are diagrams illustrating an appearance of the channel body and various modification examples in the CEM according to the present embodiment.
Figure 5D:
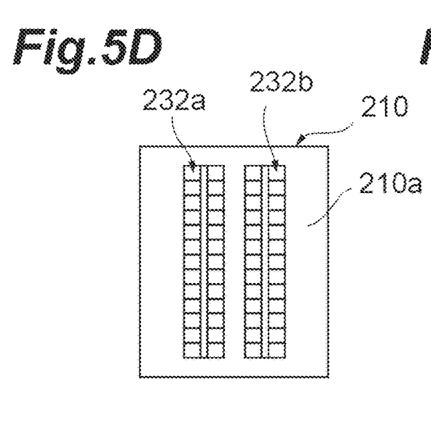

The IN electrode 150 includes a metal flange 151, a metal cap 152, a mesh electrode 153 (an electrode having one or more openings), a metal spacer 154, and a metal ring (including a pair of metal members 155a and 155b illustrated in FIG. 5A) for fixing the IN electrode 150 itself to the channel body 210. One end of the metal flange 151 is welded to the metal ring (including the pair of metal members 155a and 155b) attached to a groove (groove 251 illustrated in FIG. 5A) of grooves provided on the side surface of the channel body 210 which is close to the input end face 210a, and the other end extends toward the external electrode 300. The metal cap 152 has a shape capable of housing a distal end including the input end face 210a of the channel body 210, and has one end welded to the metal spacer 154 housed in the metal flange 151. Accordingly, the input end face 210a of the channel body 210 is covered with the metal cap 152 in a state of being in contact with the metal cap 152. Since the metal spacer 154 is also fixed in a state of being in contact with an inner wall of the metal flange 151, the metal flange 151 and the metal cap 152 are electrically connected. An opening for exposing the opening end of the tapered opening 230 of the channel 220 is provided in the metal cap 152, and a metal member (electrode) having one or more openings through which ions pass toward the tapered opening 230 is provided in the opening. This is to reduce the influence of the presence of the external electrode 300 on an electrostatic field in the tapered opening 230. In the example of FIG. 2, such a metal member (electrode) is the mesh electrode 153 which is welded to an opening end of the metal cap 152 and is comprised of a spring material, and an opening ratio thereof is preferably 50% to 95%. The mesh electrode 153 may have a plurality of types of openings having different areas. In this case, for example, the mesh electrode 153 having a structure in which an opening ratio in the vicinity of a center of a mesh is higher than an opening ratio of a peripheral region is also applicable.

Figure 6A:
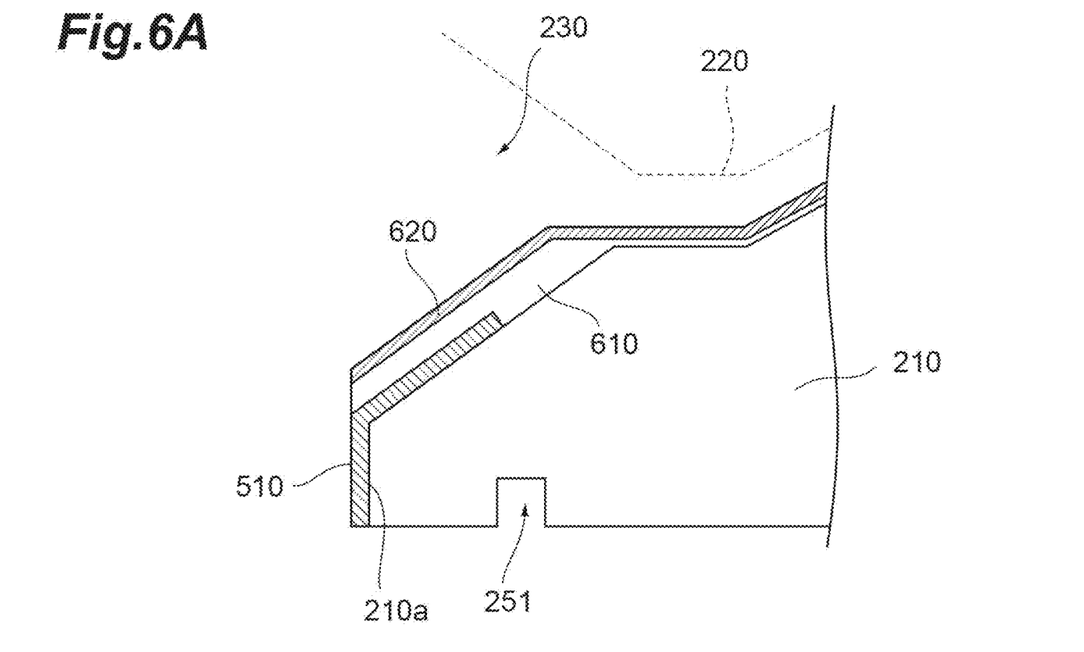
FIGS. 6A and 6B are diagrams illustrating a sectional structure near a tapered opening of the channel body in the CEM according to the present embodiment.
Figure 6B:
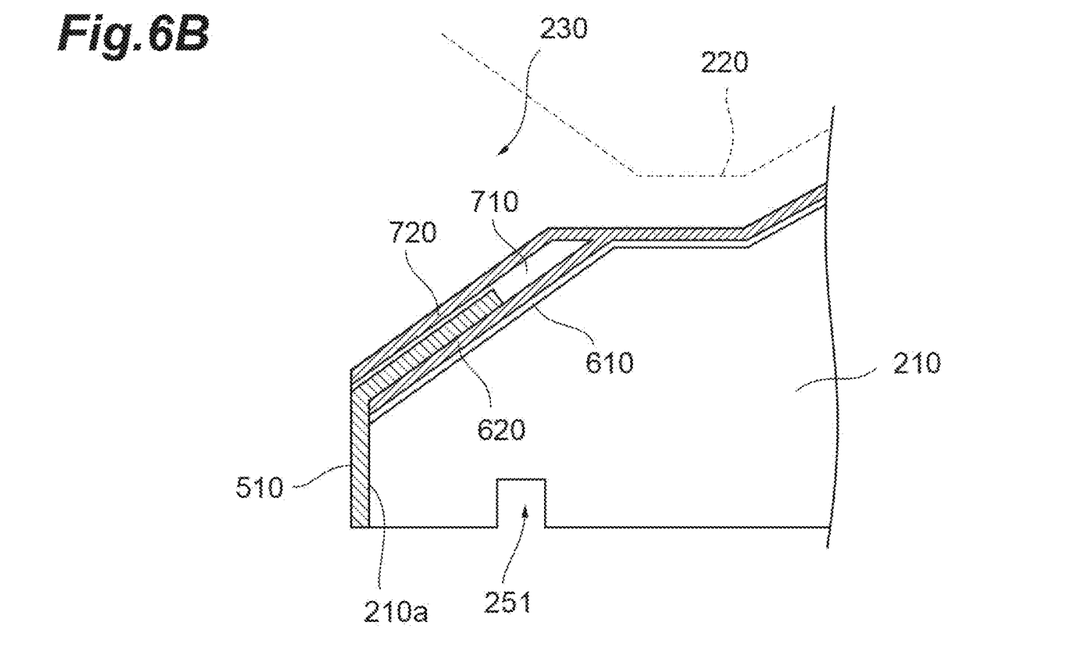

The IN electrode 150 includes input-side conductive layers 510 for electrically connecting the metal cap 152 and the input end face 210a of the channel body 210. The input-side conductive layers 510 (constituting a part of the IN electrode 150) are provided on the input end face 210a and on an inner wall of the tapered opening 230. In particular, a part of the input-side conductive layers 510 (hereinafter, referred to as an "insertion electrode") continuously extends on an inner wall surface of the tapered opening 230 from the input end face 210a toward the output port of the tapered opening 230. In the example illustrated in the plurality of drawings including FIG. 2, although only the insertion electrode (a part of the input-side conductive layers 510) is illustrated in the tapered opening 230, a specific stacked structure (including a conductive layer, an electron emission layer, and a resistance layer) illustrated in FIG. 6A or 6B is provided on the inner wall surface of the tapered opening 230.

The mesh electrode 153 is an electrode comprised of a spring material as described above. One end of the metal cap 152 is welded to the metal spacer 154 housed in the metal flange 151, and thus, the mesh electrode 153 welded to the opening of the metal cap 152 is pressed against the input end face 210a of the channel body 210 (the mesh electrode 153 and the insertion electrode portion constituting a part of the input-side conductive layers 510 have the same potential). In particular, the mesh electrode 153 is comprised of a spring material, and the mesh electrode 153 and the input-side conductive layers 510 are in close contact with each other (a stable contact state can be maintained) by a restoring force of the mesh electrode 153.

On the other hand, the OUT electrode 160 includes a metal flange 161, a metal cap 162, a metal container (including a hollow member 163a and a stein 163b) that houses the anode 400, a metal spacer 164, and a metal ring (including a pair of metal members 165a and 165b illustrated in FIG. 5A) for fixing the OUT electrode 160 itself to the channel body 210.

One end of the metal flange 161 is welded to the metal ring (including the pair of metal members 165a and 165b in FIG. 5A) attached to a groove (groove 252 illustrated in FIG. 5A) of grooves provided on the lateral surface of the channel body 210 which is close to the output end face 210b. The metal cap 162 has a shape capable of housing a distal end including the output end face 210b of the channel body 210, and has one end welded to the metal spacer 164 fixed in a state of being in contact with the metal flange 161. An opening for exposing an output port of the channel 220 located on the output end face 210b is provided in the metal cap 162. One end of the metal cap 162 is welded to the metal spacer 164 fixed to the metal flange 161 in a state of housing the distal end of the channel body 210 including the output end face 210b. Accordingly, the output-side conductive layers 520 and the metal cap 162 are in close contact with each other (the output-side conductive layers 520 and the metal cap 162 are set to the same potential).

A box defining a housing space of the anode 400 is welded to the metal flange 161 of the OUT electrode 160. The box includes the hollow member 163a and the stein 163b. One end of the hollow member 163a is directly welded to the metal flange 161, and the stein 163b is fixed to the other end. The stein 163b holds a lead pin 131 via an insulating material 132, and the anode 400 is welded to one end of the lead pin 131 extending into the hollow member 163a.

Figure 3:
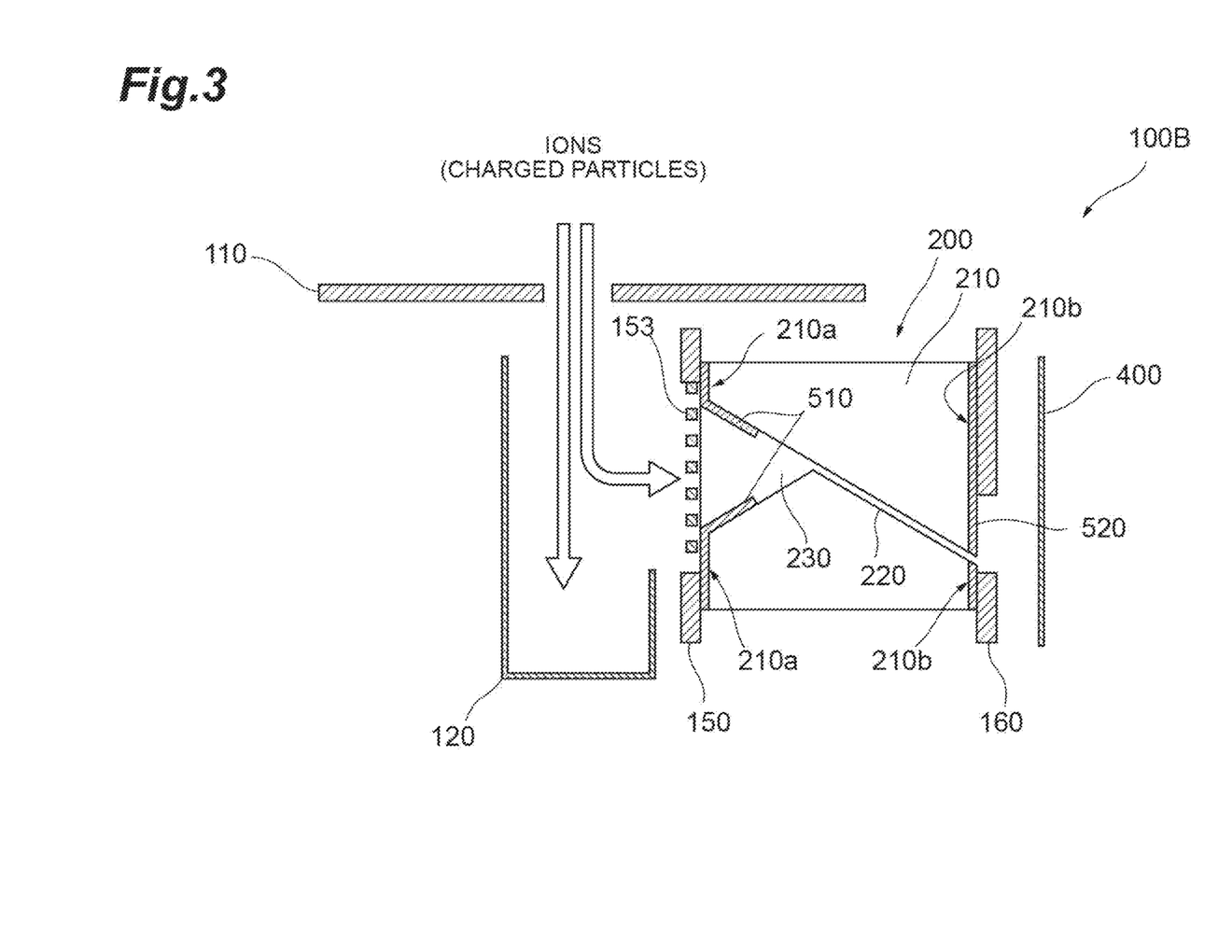
FIG. 3 is a sectional view illustrating a second structure of the ion detector according to the present embodiment.

FIG. 3 is a sectional view illustrating a second structure of the ion detector according to the present embodiment. FIG. 3 also illustrates a structure in a section corresponding to the section illustrated in FIG. 1B. An ion detector 100B having the second structure includes an aperture member 110, a Faraday cup 120, the CEM 200, and the anode 400. The aperture member 110 constitutes a part of a container of the ion detector 100B, and has an opening through which ions pass from the outside of the container to the inside of the container. The Faraday cup 120 functions to prevent ions taken in through the aperture member 110 from moving out of the ion detector 100B. The CEM 200 is disposed in a space between the Faraday cup 120 and the anode 400, and includes the IN electrode 150, the channel body 210, and the OUT electrode 160 similarly to the example of FIG. 2. More specifically, the CEM 200 includes the metal mesh electrode 153 constituting a part of the IN electrode 150, the input-side conductive layer 510 (constituting a part of the IN electrode 150) provided on the input end face 210a of the channel body 210 and on the inner wall surface of the tapered opening 230, and the output-side conductive layer 520 (constituting a part of the OUT electrode 160) provided on the output end face 210b of the channel body 210 in a state of being in contact with the output end (opening end) of the channel 220.

The Faraday cup 120, the CEM 200, and the anode 400 are housed in the container (including the aperture member 110) of the ion detector 100B.

Figure 4:
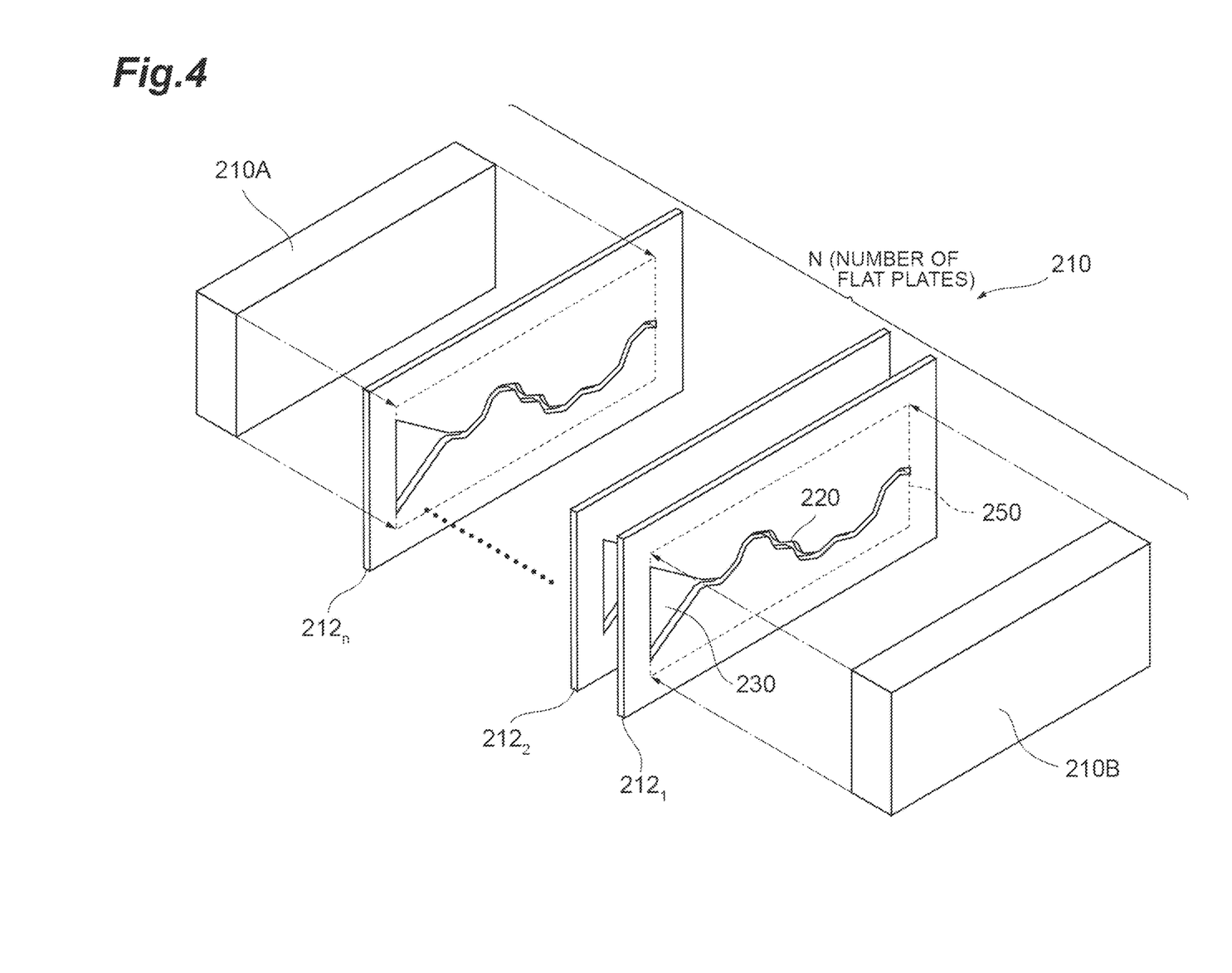
FIG. 4 is an assembly process diagram illustrating an example of a structure of a channel body in the CEM according to the present embodiment.

FIG. 4 is an assembly process diagram illustrating an example of a structure of the channel body 210 in the CEM 200 (the CEM 200 illustrated in FIGS. 2 and 3) according to the present embodiment.

As illustrated in FIG. 4, the channel body 210 is comprised of, for example, a ceramic material, and includes n (an integer of 1 or more) parallel flat plates $212_1$ to $212_n$ and a pair of auxiliary members 210A and 210B. The parallel flat plate $212_1$ to $212_n$ and the auxiliary members 210A and 210B are integrated by being pressed and sintered, respectively. After pressing and sintering, an unnecessary peripheral portion of each of the parallel flat plates $212_1$ to $212_n$ is removed along a cutout line 250 indicated by a broken line. A pattern of the channel 220 including the tapered opening 230 is provided in each of the parallel flat plates $212_1$ to $212_n$. This pattern is defined by a sectional shape of a hole penetrating each parallel flat plate from one main surface toward the other main surface.

FIGS. 5A to 5E are diagrams illustrating an appearance of the channel body 210 in the CEM 200 and various modification examples. In particular, FIG. 5A illustrates main parts of the CEM 200 including the channel body 210 obtained through the assembly process illustrated in FIG. 4 described above.

On the lateral surface of the channel body 210 in which the parallel flat plate $212_1$ to $212_n$ and the auxiliary members 210A and 210B are integrated, the groove 251 for fixing the IN electrode 150 is provided near the input end face 210a on which the opening end of the tapered opening 230 is located. On the other hand, the groove 252 for fixing the OUT electrode 160 is provided near the output end face 210b on the lateral surface of the channel body 210. Here, a metal ring for fixing the IN electrode 150 to the channel body 210 is fitted into the groove 251, and in the example of FIG. 5A, the metal ring includes the pair of metal members 155a and 155b. A metal ring for fixing the OUT electrode 160 to the channel body 210 is fitted into the groove 252, and in the example of FIG. 5A, the metal ring includes the pair of metal members 165a and 165b.

Figure 5E:
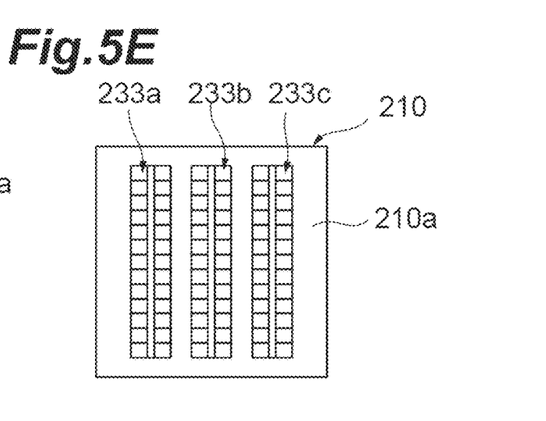

A plurality of channels may be provided in the channel body 210. FIGS. 5B to 5E are front views when the input end face 210a of the channel body 210 illustrated in FIG. 5A described above is viewed, and illustrate various channel arrangement patterns on the input end face 210a. FIG. 5B illustrates an arrangement pattern in which one channel is provided in the channel body 210 as illustrated in FIG. 5A, and the tapered opening 230 of one channel 220 is disposed on the input end face 210a. In the example of FIG. 5B, although a shape of the opening end of the tapered opening 230 is quadrilateral, the selection of the shape is not particularly technically limited (any shape is selected). FIG. 5C illustrates an arrangement pattern in which two channels are provided in the channel body 210, and tapered openings 231a and 231b each having a square opening end are arranged on the input end face 210a. Although FIG. 5D also illustrates an arrangement pattern in which two channels are provided in the channel body 210, tapered openings 232a and 232b each having a rectangular opening end are arranged on the input end face 210a. FIG. 5E illustrates an arrangement pattern in which three channels are provided in the channel body 210, and tapered openings 233a, 233b, and 233c each having a rectangular opening end are arranged on the input end face 210a.

FIGS. 6A and 6B are diagrams illustrating a sectional structure of the channel body 210 near the tapered opening 230 in the CEM according to the present embodiment. FIGS. 6A and 6B illustrate a structure in a section corresponding to the section illustrated in FIG. 1B.

In the first stacked structure applicable to the CEM 200 according to the present embodiment, as illustrated in FIG. 6A, the insertion electrode (a part of the input-side conductive layers 510) is directly provided on the inner wall of the tapered opening 230 from the input end face 210a toward the output port of the tapered opening 230. A first resistance layer 610 is provided on the insertion electrode. The first resistance layer 610 is also provided directly on the inner wall surface of the channel 220 from the distal end of the insertion electrode to the output port of the channel 220 located on the output end face 210b. A first electron emission layer 620 is provided on the first resistance layer 610 so as to cover the entire first resistance layer 610.

On the other hand, in the second stacked structure applicable to the CEM 200 according to the present embodiment, as illustrated in FIG. 6B, the first resistance layer 610 is directly provided on the inner wall of the channel 220 from the input end face 210a to the output end face 210b. The first electron emission layer 620 is provided on the first resistance layer 610 so as to cover the entire first resistance layer 610. The insertion electrode (a part of the input-side conductive layers 510) is provided directly on the first electron emission layer 620 from the input end face 210a toward the output port of the tapered opening 230. A second resistance layer 710 is provided on the insertion electrode, and a second electron emission layer 720 is further provided on the second resistance layer 710. Here, the second electron emission layer 720 is preferably comprised of a high-gamma material (the high gamma means that a value (calculated by "number of emitted secondary electrons/number of incident ions") when ions accelerated at a predetermined voltage are incident is high.) such as $MgF_2$ (magnesium fluoride). The example of FIG. 6B illustrates a structure in which the first resistance layer 610 directly covers the entire inner wall surface of the channel 220. Thus, the patterning of the layers (the conductive layer and the resistance layer) provided on the inner wall surface of the channel 220 becomes unnecessary. As a result, the stacked structure illustrated in FIG. 6B is easier to be manufactured than the stacked structure illustrated in FIG. 6A.

In both the examples of FIGS. 6A and 6B, the insertion amount (the length defined along a central axis of the tapered opening 230 passing through the output port, similar to the taper length) of the insertion electrode is preferably ½ or less of the taper length. As illustrated in FIG. 1B, the taper length is defined by the distance from the opening end of the tapered opening (matching the input end face 210a of the channel body 210) to the output port of the tapered opening.

Figure 7A:
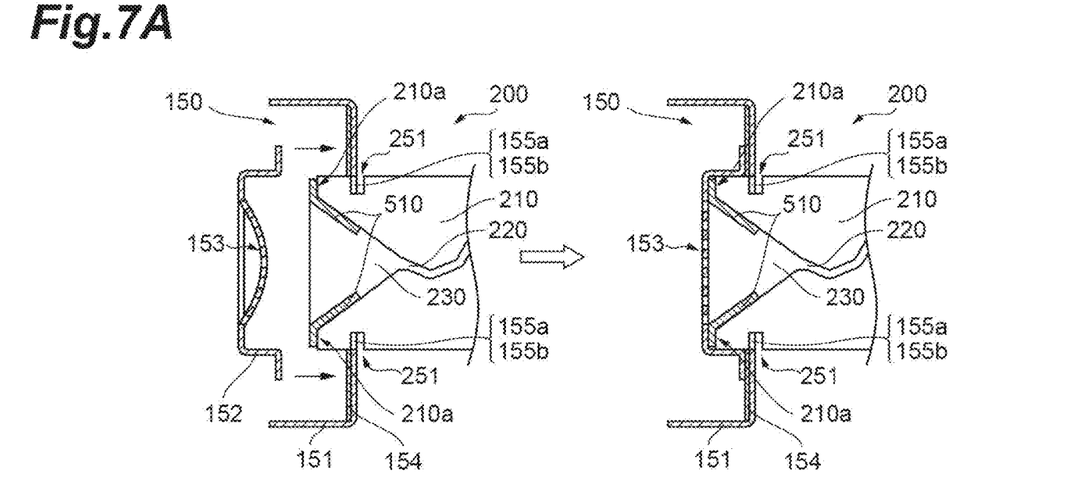
FIGS. 7A to 7C are diagrams illustrating various sectional structures near an IN electrode applicable to the CEM according to the present embodiment.
Figure 7B:
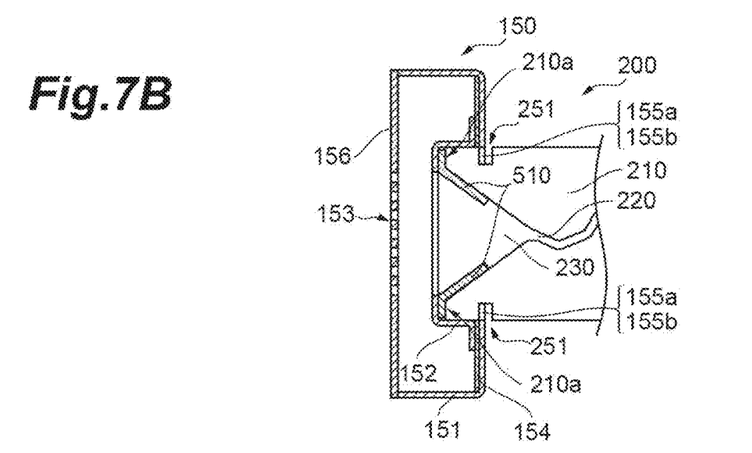
Figure 7C:
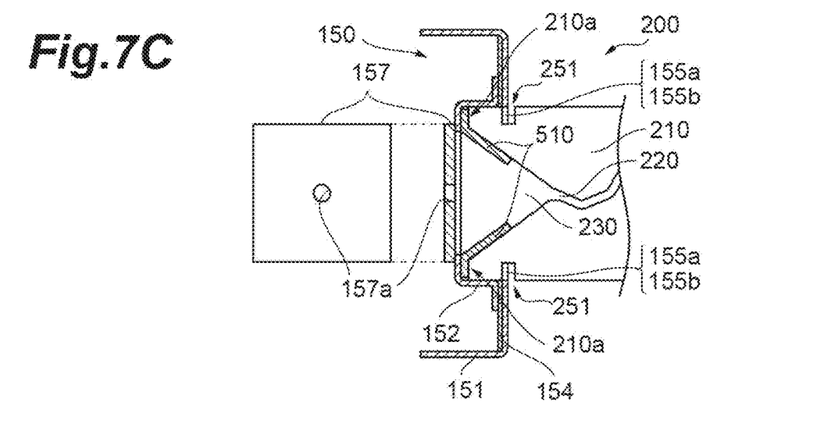

FIGS. 7A to 7C are diagrams illustrating various sectional structures near an IN electrode applicable to the CEM according to the present embodiment. FIGS. 7A to 7C illustrate a structure in a section corresponding to the section illustrated in FIG. 1B. In the example of FIG. 7A, an assembly process diagram is illustrated in order to describe substantially the structure near the IN electrode 150 illustrated in FIG. 2 in detail.

FIG. 7A illustrates states before and after the metal cap 152 is welded to the metal flange 151 constituting the IN electrode 150. That is, one end of the metal flange 151 is welded to the metal ring including the pair of metal members 155a and 155b at the distal end (location in which the groove 251 is provided) of the channel body 210 including the input end face 210a, and thus, the metal flange 151 is fixed to the channel body 210. At this time, the metal spacer 154 is fixed in the metal flange 151 (conduction state). The input-side conductive layers 510 are provided on the input end face 210a of the channel body 210 and the inner wall surface of the tapered opening 230 (from the input end face 210a to the vicinity of the center of the inner wall of the tapered opening 230), and a part of the input-side conductive layers 510 located on the inner wall of the tapered opening 230 functions as the insertion electrode.

The opening for exposing the tapered opening 230 is provided in the metal cap 152, and the mesh electrode 153 is comprised of a spring material, and is welded to the opening end of the metal cap 152 in a state of being curved so as to protrude toward the output port of the tapered opening 230. Here, the opening ratio of the mesh electrode 153 is preferably 50% to 95%. The mesh electrode 153 may have a plurality of types of openings having different areas. For example, the mesh electrode 153 having a structure in which the opening ratio in the vicinity of the center of the mesh is higher than the opening ratio of the peripheral region is also applicable. One end of the metal cap 152 to which the curved mesh electrode 153 is attached is welded to the metal spacer 154 fixed in the metal flange 151. At this time, the input-side conductive layer 510 provided on the input end face 210a is pressed by the metal cap 152. Accordingly, the mesh electrode 153 is deformed, and the mesh electrode 153 and the input-side conductive layers 510 are brought into close contact with each other by the restoring force of the mesh electrode 153.

In the example of FIG. 7A, although the mesh electrode 153 is directly disposed on the input end face 210a of the channel body 210 via the input-side conductive layers 510, the mesh electrode 153 may not be directly disposed on the input end face 210a of the channel body 210. That is, the example of FIG. 7B is different from the example of FIG. 7A in that the mesh electrode 153 is provided at a location separated from the input end face 210a by a predetermined distance. In the example of FIG. 7B, a metal plate 156 on which the mesh electrode 153 is provided at the opening end is welded to the other end of the metal flange 151 instead of the opening of the metal cap 152. Since both the metal flange 151 and the metal cap 152 are metal members constituting a part of the IN electrode 150, the mesh electrode 153 and the input-side conductive layers 510 are set to the same potential as in the example of FIG. 7A. Accordingly, the electrostatic field in the tapered opening 230 is hardly influenced by the external electric field due to the mesh electrode 153. The structure of the IN electrode 150 illustrated in FIG. 7B is the same as the structure of the IN electrode 150 illustrated in FIG. 7A except for the arrangement location of the mesh electrode 153.

In the example of FIG. 7C, an aperture member 157 having an opening 157a through which ions pass is applied instead of the mesh electrode 153 of FIG. 7A. The aperture member 157 is welded to the metal cap 152 so as to cover the opening of the metal cap 152, and the aperture member 157 and the input-side conductive layer 510 are set at a conductive potential. In particular, when the trajectory of the ions reaching the tapered opening 230 is limited (when a beam diameter of an input ion beam is smaller than an opening diameter of the tapered opening 230), since ion transmittance is superior to that of the mesh electrode 153, such an aperture member 157 is preferably applied as the structure of the IN electrode 150. The structure of the IN electrode 150 illustrated in FIG. 7C is the same as the structure of the IN electrode 150 illustrated in FIG. 7A except for a difference between the mesh electrode 153 and the aperture member 157.

Figure 8A:
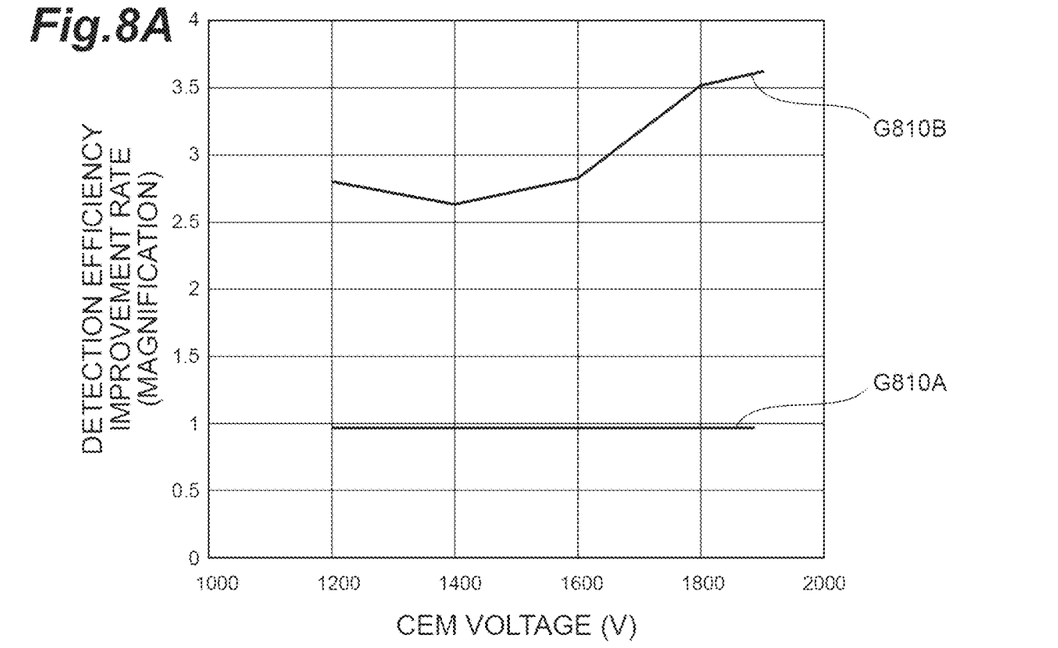
FIGS. 8A and 8B are graphs representing measurement results of detection efficiency improvement rates and sensitivity improvement rates for various CEM structures applied to the ion detector illustrated in FIG. 3.
Figure 8B:
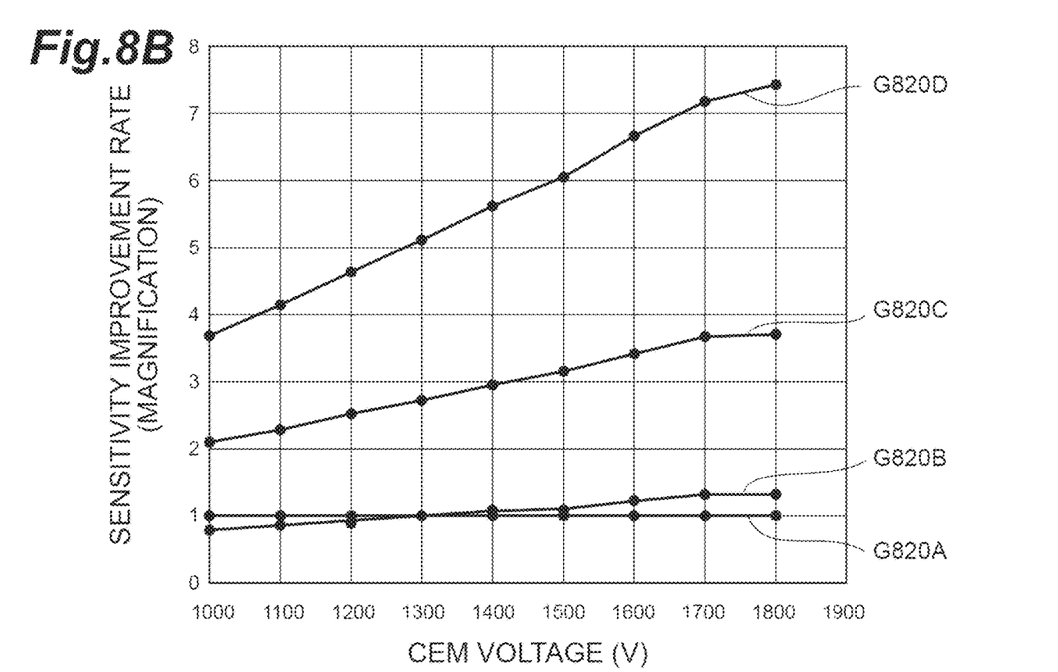

FIGS. 8A and 8B are graphs representing measurement results of detection efficiency improvement rates and sensitivity improvement rates for various structures applied to the ion detector illustrated in FIG. 3. In the present specification, "detection efficiency" is defined by output current/(input ion current×CEM gain)×100. "Sensitivity" substantially means a gain obtained by the ion detector.

FIG. 8A illustrates a measurement result for a structure in which the insertion electrode (a part of the input-side conductive layers 510) is not provided in the tapered opening 230 in the ion detector 100B illustrated in FIG. 3. In FIG. 8A, a graph G810A is a measurement result of a reference structure (corresponding to the above-described first CEM structure) from which the mesh electrode 153 is removed, and a graph G810B is a measurement result of a structure (corresponding to the above-described third CEM structure) in which the mesh electrode 153 is provided at the opening end of the tapered opening 230. A vertical axis in FIG. 8A indicates a magnification based on the measurement result indicated by the graph G810A.

On the other hand, FIG. 8B illustrates the measurement results of the structure in which the mesh electrode 153 is provided at the opening end of the tapered opening 230 in the ion detector 100B illustrated in FIG. 3. In FIG. 8B, a graph G820A is a measurement result of a reference structure (corresponding to the above-described third CEM structure) in which only the mesh electrode 153 is disposed, and graphs G820B to G820D are all measurement results of a structure (a structure in which the above-described second CEM structure and the above-described third CEM structure are combined) in which the insertion electrode is provided in the input-side conductive layer 510. In particular, the graph G820B is a measurement result of a structure in which the insertion amount of the insertion electrode is set to ¾ of the taper length, the graph G820C is a measurement result of a structure in which the insertion amount of the insertion electrode is set to ¼ of the taper length, and the graph G820D is a measurement result of a structure in which the insertion amount of the insertion electrode is set to ½ of the taper length. A vertical axis in FIG. 8B indicates a magnification based on the measurement result indicated by the graph G820A (substantially matching the graph G810B in FIG. 8A).

In the case of the structure in which the insertion electrode is not provided in the tapered opening 230, as can be seen from FIG. 8A, in the structure to which the mesh electrode 153 is applied, the detection efficiency is improved by 3.1 times on average with respect to the structure without the mesh electrode 153. In the case of the structure to which the mesh electrode 153 is applied, as illustrated in FIG. 8B, in the structure in which the insertion amount of the insertion electrode is set to ½ of the taper length, the sensitivity is improved by 7.4 times with respect to the structure in which the insertion electrode is not provided in the tapered opening 230. From the above measurement results, by the "introduction of the insertion electrode" and the "adoption of the mesh electrode (electrode having one or more openings)", sensitivity can be improved by about 23 times at maximum as the structure in the related art in which the insertion electrode and the mesh electrode are not adopted.

As described above, according to the present embodiment, the loss of the CEM voltage defined by the voltage difference between the IN electrode (input-side electrode) and the OUT electrode (output-side electrode) can be reduced (gain is improved) by disposing a part (the insertion electrode) of the input-side conductive layers installed on the input end face in the tapered opening provided on the input side of the channel. It is possible to secure a sufficient effective area in the tapered opening (avoid the influence of the external electric field) by disposing the electrode having one or more openings set to the same potential as that of the input-side conductive layer on the opening end side of the tapered opening.

From the above description of the present invention, it is apparent that the present invention can be variously modified. Such modifications cannot be regarded as departing from the spirit and scope of the present invention, and improvements obvious to all those skilled in the art are included in the following claims.

What is claimed is:

1. A channel electron multiplier comprising:
    a channel body having an input end face that charged particles reach, an output end face opposing the input end face, and at least one channel connecting the input end face and the output end face, the channel body having a first resistance layer and a first electron emission layer formed on an inner wall surface of the channel;
    an input-side conductive layer provided so as to continuously cover the input end face and a part of the inner wall surface of a channel;
    an output-side conductive layer provided on the output end face such that at least a part thereof is located at an opening end of the channel; and
    an electrode disposed on an opposite side of the output end face with respect to the input end face, the electrode having at least one opening through which the charged particles pass toward the input end face,
    wherein the channel includes a tapered opening having an opening end matching the input end face and having an inner wall surface formed such that a sectional area decreases from the input end face to the output end face, and
    the input-side conductive layer and the electrode are set to the same potential.

2. The channel electron multiplier according to claim 1, wherein, in an input-side region of the tapered opening including at least the opening end matching the input end face,
    a part of the input-side conductive layer is directly provided on an inner wall of the tapered opening.

3. The channel electron multiplier according to claim 1, wherein, in an input-side region of the tapered opening including at least the opening end matching the input end face,
    the first resistance layer is directly provided on an inner wall of the tapered opening,
    the first electron emission layer is directly provided on the first resistance layer, and
    a part of the input-side conductive layer is directly provided on the first electron emission layer.

4. The channel electron multiplier according to claim 3, wherein, in the input-side region of the tapered opening including at least the opening end matching the input end face,
    a second resistance layer is directly provided on the input-side conductive layer, and
    a second electron emission layer is directly provided on the second resistance layer.

5. The channel electron multiplier according to claim 4, wherein the second electron emission layer is comprised of a high-gamma material.

6. The channel electron multiplier according to claim 5, wherein the second electron emission layer is comprised of magnesium fluoride.

7. The channel electron multiplier according to claim 1, wherein, as a length defined along a central axis of the channel body extending from the input end face toward the output end face, a length of a part of the input-side conductive layer located in the tapered opening is less than or equal to ½ of a taper length of the tapered opening.

8. The channel electron multiplier according to claim 1, wherein the electrode is in contact with the input-side conductive layer.

9. The channel electron multiplier according to claim 8, wherein the electrode is comprised of a spring material.

10. The channel electron multiplier according to claim 1, wherein the electrode is disposed at a location separated from the input-side conductive layer by a predetermined distance in a space on an opposite side of the output end face with respect to the input end face.

11. The channel electron multiplier according to claim 1, wherein the electrode has a mesh structure.

12. An ion detector comprising:
    the channel electron multiplier according to claim 1; and
    an anode configured to capture electrons emitted from the output end face of the channel electron multiplier.

13. An ion detector comprising:
    the channel electron multiplier according to claim 1;
    an aperture member through which the charged particles pass toward a space in which the channel electron multiplier is disposed;
    a Faraday cup configured to shield charged particles, of the charged particles passed through the aperture member, traveling toward a space excluding the input end face of the channel electron multiplier; and
    an anode configured to capture electrons emitted from the output end face of the channel electron multiplier.

* * * * *